(12) United States Patent
Naveh

(10) Patent No.: US 9,058,209 B2
(45) Date of Patent: Jun. 16, 2015

(54) METHODS AND APPARATUS FOR EFFICIENT TONE DETECTION

(75) Inventor: Gil Naveh, Modiin (IL)

(73) Assignee: Intel Corporation, Santa Clara, CA (US)

(*) Notice: Subject to any disclaimer, the term of this patent is extended or adjusted under 35 U.S.C. 154(b) by 527 days.

(21) Appl. No.: 13/442,169

(22) Filed: Apr. 9, 2012

(65) Prior Publication Data

US 2013/0268571 A1 Oct. 10, 2013

(51) Int. Cl.
*G06F 17/10* (2006.01)
*G06F 7/50* (2006.01)
*G06F 7/52* (2006.01)

(52) U.S. Cl.
CPC .. *G06F 7/50* (2013.01); *G06F 7/52* (2013.01); *G06F 17/10* (2013.01)

(58) Field of Classification Search
None
See application file for complete search history.

(56) References Cited

U.S. PATENT DOCUMENTS

| | | | | |
|---|---|---|---|---|
| 5,119,322 A | * | 6/1992 | Stroobach | 708/312 |
| 5,136,531 A | * | 8/1992 | McCaslin | 708/312 |
| 5,563,817 A | * | 10/1996 | Ziegler et al. | 708/322 |
| 5,995,557 A | * | 11/1999 | Srinivasan | 375/316 |
| 6,026,419 A | * | 2/2000 | Hasegawa | 708/312 |
| 6,665,021 B2 | * | 12/2003 | Felts, III | 348/607 |
| 2007/0263842 A1 | * | 11/2007 | Pessoa | 379/283 |

OTHER PUBLICATIONS

Zhang, K. et al., A Digital Decoder Based on a Modified Goertzel Algorithm, Proceedings of International Conference on Audio, Language and Image Processing (ICALIP), Jul. 2008, pp. 779-783, IEEE.

* cited by examiner

*Primary Examiner* — Michael D Yaary
(74) *Attorney, Agent, or Firm* — Otterstedt, Ellenbogen & Kammer, LLP

(57) ABSTRACT

An apparatus for determining the presence of a tone in an input signal includes memory circuitry and data processing circuitry coupled to the memory circuitry. The data processing circuitry is operative to receive multiple samples of the input signal, and to determine a first value at least in part by multiplying each of the samples by respective ones of a first set of values for an impulse response and summing the results. The data processing system is also operative to determine a second value at least in part by multiplying each of a portion of the samples by respective ones of a second set of values for the impulse response and summing the results. The data processing system is operative to determine the power of the tone in the multiple samples of the input signal at least in part by utilizing the first value and the second value.

21 Claims, 3 Drawing Sheets

FIG. 1

| Cycle Num. | Arith. Unit #1 | Arith. Unit #2 | Arith. Unit #3 | Arith. Unit #4 | Load Unit #1 | Load Unit #2 | Comment |
|---|---|---|---|---|---|---|---|
| 0 | D0=0 | D1=0 | D2=0 | D3=0 | x(0)<br>x(1)<br>x(2)<br>x(3) | $h_1$(N-1)<br>$h_1$(N-2)<br>$h_1$(N-3)<br>$h_1$(N-4) | |
| 1 | D0=D0+<br>x(0)*$h_1$(N-1)+<br>x(1)*$h_1$(N-2) | D1=D1+<br>x(2)*$h_1$(N-3)+<br>x(3)*$h_1$(N-4) | D2=D2+<br>x(0)*$h_1$(N-2)+<br>x(1)*$h_1$(N-3) | D3=D3+<br>x(2)*$h_1$(N-4) | x(4)<br>x(5)<br>x(6)<br>x(7) | $h_1$(N-5)<br>$h_1$(N-6)<br>$h_1$(N-7)<br>$h_1$(N-8) | x(3) is kept in the processor's registers |
| 2 | D0=D0+<br>x(4)*$h_1$(N-5)+<br>x(5)*$h_1$(N-6) | D1=D1+<br>x(6)*$h_1$(N-7)+<br>x(7)*$h_1$(N-8) | D2=D2+<br>x(3)*$h_1$(N-5)+<br>x(4)*$h_1$(N-6) | D3=D3+<br>x(5)*$h_1$(N-7)+<br>x(6)*$h_1$(N-8) | x(8)<br>x(9)<br>x(10)<br>x(11) | $h_1$(N-9)<br>$h_1$(N-10)<br>$h_1$(N-11)<br>$h_1$(N-12) | x(4) is kept in the processor's registers |
| ⋯ | ⋯ | ⋯ | ⋯ | ⋯ | ⋯ | ⋯ | ⋯ |
| N/4-1 | D0=D0+<br>x(N-8)*$h_1$(7)+<br>x(N-7)*$h_1$(6) | D1=D1+<br>x(N-6)*$h_1$(5)+<br>x(N-5)*$h_1$(4) | D2=D2+<br>x(N-9)*$h_1$(7)+<br>x(N-8)*$h_1$(6) | D3=D3+<br>x(N-7)*$h_1$(5)+<br>x(N-6)*$h_1$(4) | x(N-4)<br>x(N-3)<br>x(N-2)<br>x(N-1) | $h_1$(3)<br>$h_1$(2)<br>$h_1$(1)<br>$h_1$(0) | x(N-9) is kept in the processor's registers |
| N/4 | D0=D0+<br>x(N-4)*$h_1$(3)+<br>x(N-3)*$h_1$(2) | D1=D1+<br>x(N-2)*$h_1$(1)+<br>x(N-1)*$h_1$(0) | D2=D2+<br>x(N-5)*$h_1$(3)+<br>x(N-4)*$h_1$(2) | D3=D3+<br>x(N-3)*$h_1$(1)+<br>x(N-2)*$h_1$(0) | | | x(N-5) is kept in the processor's registers |
| N/4+1 | D0=D0+D1 | | D2=D2+D3 | | | $e^{-j\omega}$ | D0=$y_1$(N-1)<br>D2=$y_1$(N-2) |
| N/4+2 | D0=D0−D2*$e^{-j\omega}$ | | | | | | D0=y(N-1) |

METHODS AND APPARATUS FOR EFFICIENT TONE DETECTION

BACKGROUND

Tone detection functionality is needed for many common electronic applications. In telephony, for example, several functions require the detection of Dual-Tone Multi-Frequency (DTMF) signaling, which may be generated by the pressing of keys on a telephone handset. Additional applications related to telephony include the controlling of echo cancellers as well as the detection of dial tones and busy tones. Even another application utilizing tone detection is the detection and negotiation of facsimile (fax) transmissions.

Tone detection tasks are commonly performed by digital signal processors (DSPs), specialized microprocessors with architectures well suited to the fast operational needs of digital signal processing. Many advanced DSPs today include a set of multiply-accumulator units (MAC units) capable of performing multiply-accumulate operations (MAC operations) that calculate $A=A+B*C$ in a single clock cycle. MAC operations are used extensively in digital signal processing to convolve filters, calculate dot products, evaluate polynomials, and the like.

SUMMARY

Illustrative embodiments of the invention relate to apparatus and methods for use in detecting tones in input signals. By utilizing convolution techniques rather than iteration techniques, these apparatus and method embodiments are able to detect tones in a substantially more efficient manner than the prior art.

In accordance with an embodiment of the invention, an apparatus for determining the presence of a tone in an input signal comprises memory circuitry and data processing circuitry coupled to the memory circuitry. Configured in this manner, the data processing circuitry is operative to receive a plurality of samples of the input signal, and to determine a first value at least in part by multiplying each of the plurality of samples of the input signal by respective ones of a first set of values for an impulse response and summing the results. The data processing system is also operative to determine a second value at least in part by multiplying each of a portion of the plurality of samples of the input signal by respective ones of a second set of values for the impulse response and summing the results. Ultimately, the data processing system is operative to determine the power of the tone in the plurality of samples of the input signal at least in part by utilizing the first value and the second value.

In accordance with another embodiment of the invention, a method for determining the presence of a tone in an input signal comprises receiving a plurality of samples of the input signal. A first value is then determined at least in part by multiplying each of the plurality of samples of the input signal by respective ones of a first set of values for an impulse response and summing the results. A second value is also determined at least in part by multiplying each of a portion of the plurality of samples of the input signal by respective ones of a second set of values for the impulse response and summing the results. The power of the tone in the plurality of samples of the input signal is determined at least in part by utilizing the first value and the second value.

In accordance with yet another embodiment of the invention, a computer program code product comprising a non-transient computer readable storage medium has computer readable program code embodied thereon. The computer readable program code, when executed on a data processing system, is configured to cause the data processing system to receive a plurality of samples of an input signal, and to determine a first value at least in part by multiplying each of the plurality of samples of the input signal by respective ones of a first set of values for an impulse response and summing the results. The computer readable program code is also configured to cause the data processing system to determine a second value at least in part by multiplying each of a portion of the plurality of samples of the input signal by respective ones of a second set of values for the impulse response and summing the results. The computer readable program code is further operative to cause the data processing system to determine the power of a tone in the plurality of samples of the input signal at least in part by utilizing the first value and the second value.

Embodiments of the present invention will become apparent from the following description of embodiments thereof, which are to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 1 shows a table of pseudo code for implementing a Novel Tone Detection Method in accordance with an illustrative embodiment of the invention;

Figure 2:
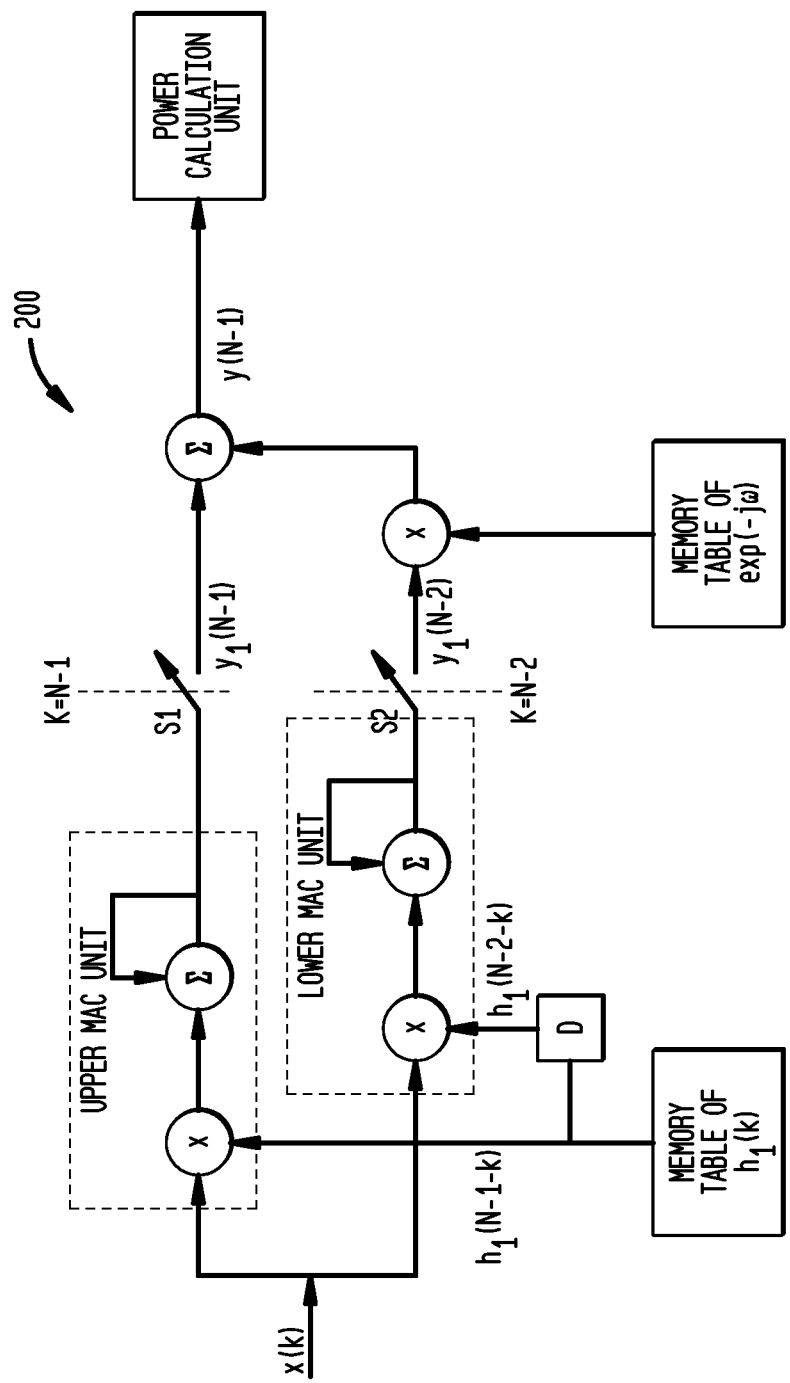
FIG. 2 shows a block diagram of at least a portion of a DSP in accordance with a first illustrative embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

The present invention, according to aspects thereof, will be described herein in the context of illustrative hardware and hardware/software embodiments. It should be understood, however, that the present invention is not limited to these or any other particular circuit arrangements and/or sequences of instructions. Rather, the invention is more generally applicable to any digital systems (hardware and/or software) utilized for tone detection. As a result, it will become apparent to those skilled in the art given the teachings herein that numerous modifications can be made to the embodiments shown that are within the scope of the present invention. That is, no limitations with respect to the specific embodiments described herein are intended or should be inferred.

1. Tone Detection Processes

An application that utilizes digital tone detection typically performs three functions:
  A. Filtering (transforming) a digital input signal;
  B. Calculating the power of the transformed input signal at a particular frequency under evaluation; and
  C. Making a decision based on the calculated power.

The input signal is first segmented into appropriate data segments (typically of about 2-5 milliseconds (ms) in duration each). The segmented input signal is then filtered (transformed) at the frequency under evaluation. The power of the transformed output at the frequency under evaluation is calculated, and finally processed by a decision process. The decision process may, for example, compare the calculated power to a predetermined threshold value. Optionally, the decision may also take into account the powers from previous data segments to enhance the decision quality.

1.1. Discrete Fourier Transform (DFT) Method

In the DFT method, the input signal x(n) is passed through a single frequency Fourier transform according to the following formula:

$$X(\omega) = \Sigma_{n=0}^{N-1} x(n) e^{-j\omega n} \qquad (1)$$

where x(n) is the input signal; ω is the angular frequency $\omega = 2\pi f / f_s$ where f is the frequency of the tone under evaluation and $f_s$ is the sampling frequency; N is the number of samples among which the existence of the tone is being evaluated; j is the complex number $j = \sqrt{-1}$; $\exp(-j\omega n) = \cos(\omega n) + j \sin(\omega n)$; and X(ω) is the filtered (transformed) input signal at the evaluated frequency f. The input signal x(n) can be complex or real, but is typically real in telephony applications. The sampling frequency $f_s$ in a telephony application may be, for example, 8 kilohertz (kHz) which translates to N=40 in 5 ms.

The result of Equation 1, X(ω), is a complex number:

$$X(\omega) = X_r(\omega) + j X_i(\omega) \qquad (2)$$

where $X_r(\omega)$ and $X_i(\omega)$ are the real and imaginary components, respectively, of the complex value X(ω). Once these values are computed, the power of the transformed signal, E, is, by definition, the sum of squares of the real and imaginary components:

$$E = [X_r(\omega)]^2 + [X_i(\omega)]^2 \qquad (3)$$

1.2. Goertzel Filtering Method

Goertzel filtering is a modified approach to calculate the DFT transformation at the desired frequency f. In this method, the DFT is evaluated via passing the input signal, x(n), through two cascaded filters. More particularly, in the Goertzel-based algorithm, X(ω) is given by:

$$X(\omega) = y(N-1) \cdot e^{-\omega(N-1)} \qquad (4)$$

where $$y(N-1) = y_1(N-1) - y_1(N-2) \cdot e^{-j\omega} \qquad (5)$$

and $$y_1(n) = x(n) + 2 \cdot \cos(\omega) \cdot y_1(n-1) - y_1(n-2) \qquad (6)$$

Equation 6 is evaluated for n=0 to n=N−1. The initial conditions $y_1(-1)$ and $y_1(-2)$ can be set to zero or, alternatively, be taken as the last two $y_1$ samples of the previous data segment. It is noted that there are other variants of the Goertzel algorithm that use a complex first order differential equation instead of the real-valued second order equation of Equation 6, but the fundamental technique and limitations are substantially the same.

It is noted that y(N−1) needs to be calculated only once for the last sample y(N−1) to detect a tone over an N sample data segment. Equation 6 on the other hand needs to be evaluated recursively for all the samples of $y_1$ since obtaining $y_1(N-2)$ and $y_1(N-1)$ for Equation 5 requires all previous values of $y_1$ to be determined. Ultimately, the power, E, for the transformed signal can be calculated utilizing the same power calculation utilized with the DFT method, namely Equation 3.

1.3. Novel Tone Detection Method

Equations 5 and 6 are realizations of a system with two cascaded filters as given in the following equations:

$$y(n) = y_1(n) * h_2(n) \qquad (7)$$

and $$y_1(n) = x(n) * h_1(n) \qquad (8)$$

or $$y(n) = x(n) * h_1(n) * h_2(n) \qquad (9)$$

where the "*" operator in Equations 7-9 above represents a convolution operation.

From the Z-transforms of $h_1$ and $h_2$ it is apparent that $h_1$ is a system with poles (i.e., an infinite impulse response (IIR) filter) while $h_2$ is a zero-only system (i.e., a finite impulse response (FIR) filter). The transfer function of $h_1$ is given by:

$$H_1(z) = \frac{1}{1 - 2 \cdot \cos(w) \cdot z^{-1} + z^{-2}} \qquad (10)$$

and its impulse response is given by:

$$h_1(n) = \cos(nw) * [\cos(w)]^n = \Sigma_{k=0}^{n} \cos(kw) \cdot [\cos(w)]^{(k-n)} \qquad (11)$$

with the "*" operator again representing convolution operations. Notably, the impulse response $h_1(n)$ may be pre-computed and stored in a table. It can be calculated directly via Equation 11, or indirectly by generating the impulse response via Equation 10.

The impulse response of $h_2$ is:

$$H_2(z) = 1 - z^{-1} \qquad (12)$$

Now, given the impulse response of $h_1$, $y_1$ can be calculated via convolution rather than recursion. The convolution is given by:

$$y_1(n) = \Sigma_{k=0}^{n} x(k) \cdot h_1(n-k) \qquad (13)$$

Rather than needing to calculate all the values of $y_1$ in order to find $y_1(N-1)$ and $y_1(N-2)$ as was the case in Equation 6, these parameters can instead be calculated by:

$$y_1(N-1) = \Sigma_{k=0}^{N-1} x(k) \cdot h_1(N-1-k) \qquad (14)$$

and $$y_1(N-2) = \Sigma_{k=0}^{N-2} x(k) \cdot h_1(N-2-k) \qquad (15)$$

Once so calculated, these values may be placed into Equation 5 to yield, y(N−1), which in fact is a realization of the convolution of $y_1$ with $h_2$ for the last data sample only (as needed for the final segment transform). The filtered input signal X(ω) may then be determined via Equation 4.

2. Processing Efficiencies

High process efficiency in performing tone detection is highly desirable. The fewer the number of clock cycles that a tone detection function takes, generally the less power consumed and the greater the number of concurrent channels that can be processed on a given processor.

As indicated in the Background Section, in most applications, tone detection functions are implemented on DSPs. A DSP may be a processor that has, among many other components a set of multipliers and adders, a set of MAC units, and a set of buses to memory. Nevertheless, as a result of the balance between the number of multipliers or MAC units and the bandwidth of the memory buses, many DSPs cannot be 100% utilized when performing DFT- and Goertzel-based tone detection methodologies. For example many of the advanced DSPs today are capable of performing eight parallel 16-bit×16-bit (16×16) MAC operations, but are paired with memory buses with bandwidths of only 128 bits per clock cycle (what are hereafter called "typical DSPs" for conciseness). Examples of such DSPs are the SC3850 from Freescale Semiconductors Inc. (Austin, Tex., USA), the TMS320C64x+ and TMS320C66x+ from Texas Instruments (Dallas, Tex., USA), and the SC3400e from LSI Corporations (Milpitas, Calif., USA).

2.1 Processing Efficiency of the DFT Method

The DFT based transformation is based on the sum of multiplications of real values x(n) by the complex values $\exp(-j\omega n)=\cos(\omega n)-j\sin(\omega n)$. Stated another way, there are two summations:

$$X_r(\omega)=\Sigma_{n=0}^{N-1} x(n)\cdot\cos(\omega n) \quad (16)$$

and $$X_i(\omega)=\Sigma_{n=0}^{N-1} x(n)\cdot\sin(\omega n) \quad (17)$$

Accordingly, assuming that both summations can be calculated in a given DSP in parallel utilizing some MAC units to calculate $X_r(\omega)$ and others to calculate $X_i(\omega)$, there is a need to fetch 3N values from memory: N values of x, N values of the cosine function, and N values of the sine function. At the same time, the number of multiplications needed to complete the transformation is 2N: N multiplications for the real component, and N multiplications for the imaginary component.

In telephony signal processing applications, it is common to represent each value of a signal with 16 bits. The minimum number of clock cycles that a typical DSP (see Section 2 for definition) would require to determine the real values of the DFT transformation of the real signal x(n) is therefore 3N*(16/128)=3N/8 clock cycles. For N=40, this translates to 15 clock cycles. On the other hand, were there no limitation on the memory bus width in the DSP, the number of clock cycles required to do the same calculation would be 2N/8=N/4. For N=40, this translates to only 10 clock cycles.

Hence, due to the memory bus bandwidth in the above example being limited to only 128 bits, the calculation of the single tone DFT will take at least 15 clock cycles for a 40-sample input signal.

2.2 Processing Efficiency of the Goertzel Method

In the Goertzel method, the calculation of $y_1(n)$ depends on $y_1(n-1)$ and cannot be calculated until $y_1(n-1)$ has been determined. Accordingly, almost no parallelism is possible during processing, and the minimum number of clock cycles required to calculate $y_1(N-1)$ will be N clock cycles. In addition, another 1-2 clock cycles will be needed to translate $y_1(N-1)$ and $y_1(N-2)$ to $X(\omega)$ per Equation 5. For a 40-sample signal, the Goertzel method will take more than 40 clock cycles.

It is worth noting that there have been attempts to improve the efficiency of the Goertzel algorithm on DSPs with a plurality of MAC units by evaluating the difference equation and deriving a formula where $y_1(n)$ depends on $y_1(n-m)$ where m>1. This indeed enables parallelism, but at the expense of additional computations. For example, for m=2 there is a need for three multiplications per $y_1$ sample, rather than one multiplication when m=1. This fact limits the depth of evaluation of Equation 5 according to the number of available parallel MAC units in the processor. For a typical DSP (i.e., a DSP capable of performing eight parallel MAC operations), this approach is limited to m=2, which results in the minimum number of clock cycles required to calculate the algorithm being N/2 (e.g., 20 clock cycles for a 40-sample input signal).

It is also noted that the evaluation of Equation 5 may cause instabilities when dealing with long signal segments and therefore may be available for use with short signal segments only.

2.3. Processing Efficiency of Novel Tone Detection Method

From Equations 14 and 15 it may be observed that calculating $y_1(N-1)$ requires N multiplications (or MAC operations), and calculating $y_1(N-2)$ requires N-1 multiplications (or MAC operations). Accordingly, 2N-1 multiplications (or MAC operations) are required in total. For a typical DSP, this results in (2N-1)/8≅=N/4 clock cycles to calculate these values.

On the other hand, it is also observed from Equations 14 and 15 that the same set of values for x and for the cosine function are needed for the calculation of both $y_1(N-1)$ and $y_1(N-2)$. Hence only 2N values need to be fetched from memory. The number of clock cycles that are needed to load all of this data from the memory is therefore 2N*(16/128)=N/4.

Accordingly, with respect to both the number of multiplications and the bus bandwidth, the minimum number of clock cycles needed to calculate the relevant $y_1$ values for the Novel Tone Detection Method is N/4 clock cycles (e.g., 10 clock cycles for the case of 40 samples segments). This number of clock cycles is clearly less than those required for the DFT and Goertzel Methods described above.

FIG. 1 shows a table of a pseudo code for achieving the Novel Tone Detection Method on a typical DSP with eight MAC units and at least 16 registers. It is assumed that the DSP has its MAC units ordered in dot-product structures, as is typical. The ordering of the eight MAC units in dot-product structures means that the MAC units are not independent from each other. Instead, every two MAC units are tied together to generate the following calculation:

$$A=A+B\cdot C+D\cdot E \quad (18)$$

(i.e., multiply-accumulate of two multiplications). Accordingly the DSP has four "dot-product" units, which are labeled in FIG. 1 as Arithmetic Units Nos. 1-4. DSP bandwidth is still assumed to be 128 bytes with 16-bit signal values. Lastly, the DSP is assumed to have two load units capable of fetching data from memory, Load Unit No. 1 and Load Unit No. 2.

For the pseudo code description in FIG. 1, Di is used as a notation for the processor's register number i. In addition, the common load-store architecture is used as a baseline for this simulation, where data that is loaded in a certain clock cycle is available for arithmetic operations only in the following clock cycles.

The results of the pseudo-code simulation indicates that, overall, (N/4)+3 clock cycles are needed to calculate X(ω) according to the Novel Tone Detection Method, which is just three clock cycles above the theoretical lower limit of N/4. The extra three clock cycles are the overhead needed to initiate the processing: a clock cycle that loads the first set of variables from memory plus two clock cycles that combine the parallel processing to a single result.

Note that overhead clock cycles exist in any method and need to be added to the theoretical lower bound for each. For example, in the Goertzel Method, the overhead is much larger than that calculated here. For the DFT Method, the overhead is similar to Novel Tone Detection Method, namely about 3-4 clock cycles.

3. Implementation of Embodiments

Embodiments utilizing the Novel Tone Detection Method described herein can be implemented in hardware alone or in hardware executing software. The term software as used herein comprises computer-readable program code that, when executed by hardware, allows that hardware to perform a particular function or functions.

3.1 Hardware Embodiment

FIG. 2 shows a block diagram of at least a portion of a DSP 200 in accordance with a first illustrative embodiment of the invention for implementing the Novel Tone Detection Method. In the DSP 200, an input signal (i.e., a sampled signal) x(k) is fed into two processing paths. The input sample x(k) can either originate in an external device, or be loaded from memory (neither of which is explicitly shown).

The upper path feeds an upper MAC unit (composed of a respective multiplier and a respective accumulator), while the lower path feeds a lower MAC unit (also composed of its own respective multiplier and respective accumulator). The upper and lower MAC units multiply the input sample x(k) by filter coefficients $h_1(N-1-k)$ and $h_1(N-2-k)$, which are pre-stored in a memory table of $h_1(k)$. The filter coefficients are loaded from the memory table in reverse order starting at k=0 and incrementally increasing to k=N−1 once per clock cycle. A delay unit (D) causes the filter coefficient received by the lower MAC unit to be one clock cycle behind the filter coefficient being received by the upper MAC unit. Two switches, S1 and S2, are closed at k=N−1 and k=N−2, respectively, to sample the required values of $y_1(N-1)$ and $y_1(N-2)$ per Equations 14 and 15.

The last portion of the DSP 200 (that is located to the right of the switches S1 and S2) implements the final stage of the transform per Equation 4. This is a complex operation wherein $y_1(N-2)$ is multiplied by $\exp(-j\omega)$ in a multiplier and subtracted from $y_1(N-1)$ in an adder to yield y(N−1). In the present embodiment, the value $\exp(-j\omega)$ is loaded from a memory table of $\exp(-j\omega)$ although, in alternative embodiment, this value may be hard coded in the hardware since it is a single complex value. The output y(N−1) is ultimately utilized to calculate the power E in a power calculation unit via hardware implementations of the Equations 4 and 3.

3.2 Hardware Executing Software Embodiment

Figure 3:
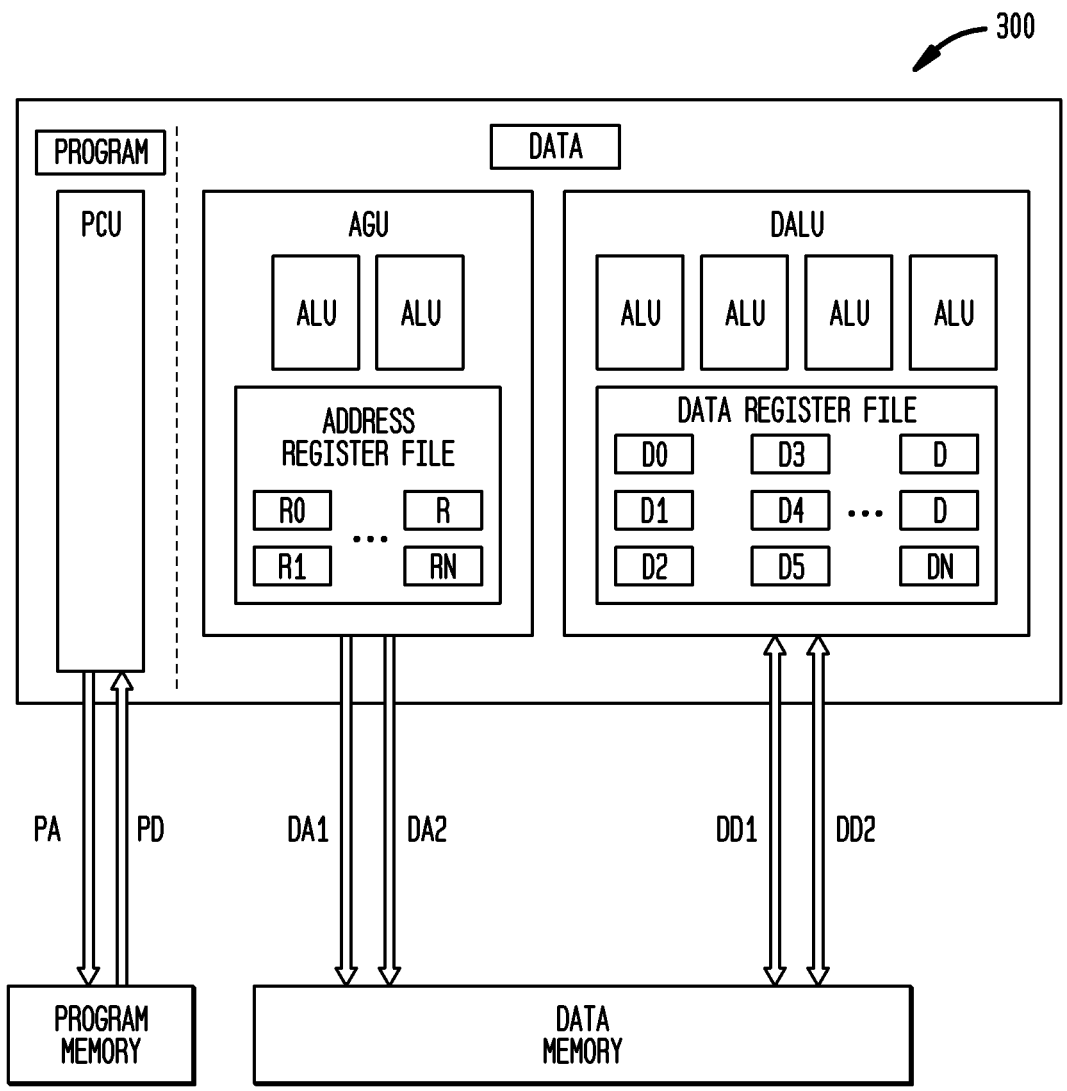
FIG. 3 shows a block diagram of at least a portion of a DSP in accordance with a second illustrative embodiment of the invention.

FIG. 3 shows a block diagram of at least a portion of a DSP 300 in accordance with a second illustrative embodiment of the invention for implementing the Novel Tone Detection Method. The DSP 300 is capable of executing software (i.e., computer-readable program code) that allows the DSP 300 to perform the pseudo code provided in FIG. 1.

The DSP 300 comprises a program control unit (PCU), an address generation unit (AGU), and a data arithmetic logic unit (DALU). A memory is divided into two parts: a program memory and a data memory. The PCU communicates with the program memory via a program address (PA) bus and a program data (PD) bus. The AGU, in turn, communicates with the data memory via a first data address (DA1) bus and a second data address (DA2) bus. Finally, the DALU communicates with the data memory via a first data (DD1) bus and a second data (DD2) bus. The DD1 and DD2 buses carry data to/from the data memory at memory addresses indicated by the DA1 and DA2 buses. The DD1 and DD2 buses are bi-directional; they enable read and write data from/to the data memory. In the present embodiment, the remaining buses are unidirectional.

The PCU issues addresses of program instructions via the PA bus and receives program instructions from the program memory via the PD bus. These instructions are then decoded and executed in the AGU and DALU. The AGU block calculates and generates memory addresses that are needed by the program (i.e., memory addresses where relevant data is located for the program execution). The AGU is able to generate two addresses in every clock cycle and accordingly has two arithmetic logic units (ALUs). These ALUs calculate the addresses to be sent to the memory as needed by the program instructions. For the address calculations, the AGU has a set of registers R that are used as inputs and outputs of the AGU's internal calculation units.

The DALU performs numeric and logic calculations. In the present embodiment, the DALU has four ALUs. Each ALU can execute a single instruction every clock cycle, giving the DALU the ability to execute four instructions in parallel every clock cycle. Each ALU comprises multiple calculation units. All the DALU instructions operate on data that is stored in the DALU's registers D. Data that is loaded from the program memory via the DD1 and DD2 buses is loaded into the registers D. Among others, the DALU's ALUs can perform add instructions (Di=Dk+Dn), multiply instructions (Di=Dk*Dn), multiply-accumulate instructions (Di=Di+Dk*Dn), dot-product instructions (Di=Dk*Dn+Dm*Dj), and dot-product-accumulate instructions (Di=Di+Dk*Dn+Dm*Dj) (where i, j, k, m, and n represent register index numbers).

So configured, the DSP 300 may execute program instructions that implement the pseudo code set forth in FIG. 1. In a first clock cycle, the DALU's ALUs initialize four data registers D to zero (e.g., D0=0, D1=0, D2=0, D3=0). In parallel, the AGU issues two data reads on the two data buses DA1 and DA2. Each data read is of four consecutive values. One bus (e.g., the DA1 bus) accesses the signal buffer x(n) and fetches four x(n) signal samples from the data memory, and the other bus (e.g., the DA2 bus) fetches four filter coefficients $h_1(k)$ from the filter buffer in the data memory. These values are loaded into the data registers D in the DALU. As just an example, signal samples x(0), x(1), x(2), and x(3) can be loaded to data registers D4, D5, D6, and D7, respectively, and filter coefficients $h_1(N-1), h_1(N-2), h_1(N-3), h_1(N-4)$ can be loaded to data registers D8, D9, D10, and D11, respectively. The DSP 300 thereby performs the functions of clock cycle 0 of the pseudo code in FIG. 1.

In the second clock cycle, the first three ALUs of the DALU execute dot-product-accumulate instruction. The first DALU ALU may perform the calculation D0=D0+D8*D0+D7*D1 that implements $D0=D0+x(0)*h_1(N-1)+x(1)*h_1(N-2)$, and so forth. The fourth DALU ALU implements a MAC instruction D3=D3+D11*D6, which implements $D3=D3+x(2)*h_1(N-4)$. In parallel to these calculations, the two data buses DA1 and DA1 perform two memory fetches of the next four values of x and $h_1$. These eight values are loaded into the DALU's registers D and are subsequently used for the calculations in the following clock cycle. The DSP 300 thereby executes the pseudo code related to cycle number 1 in FIG. 1.

Such a process is continued until ultimately $y_1(N-1)$ and $y_1(N-2)$ are calculated after (N/4)+1 clock cycles. In this clock cycle, $y_1(N-1)$ is loaded into the register D0 and $y_1(N-2)$ is loaded into the register D1. At the same time, $\exp(-j\omega)$ is fetched from the data memory. Finally, in the clock cycle (N/4)+2, y(N−1) is calculated and loaded into the register D0. This value may, in turn, be utilized to calculate the power E per Equations 4 and 3.

As is known in the art, at least a portion of one or more aspects of the methods and apparatus discussed herein may be distributed as an article of manufacture that itself includes a computer readable medium having non-transient computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the worldwide web, cables, or a wireless channel using time-division multiple access, code-division multiple access, or other radio-frequency channel). Any medium known or developed that can store, in a non-transitory manner, information suitable for use with a computer system may be used. The computer-readable code means is intended to encompass any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement the methodologies described herein.

Furthermore, it should be noted that any of the methods described herein can include an additional step of providing a system comprising distinct software modules embodied on one or more tangible computer readable storage media. All the modules (or any subset thereof) can reside on the same medium, or each module can reside on a different medium, for example. Methodologies according to embodiments of the invention can then be carried out using the distinct software modules of the system, as described above, executing on the one or more hardware processors (e.g., the DSP 300 in FIG. 3). Further, a computer program product can include a tangible computer-readable recordable storage medium with code adapted to be executed to carry out one or more steps of the illustrative methodologies described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

At least a portion of the techniques of the present invention may be implemented in an integrated circuit. In forming integrated circuits, identical die are typically fabricated in a repeated pattern on a surface of a semiconductor wafer. Each die includes an element described herein, and may include other structures and/or circuits. The individual die are cut or diced from the wafer, then packaged as an integrated circuit. One skilled in the art would know how to dice wafers and package die to produce integrated circuits. Any of the exemplary elements illustrated in, for example, FIGS. 2 and 3, or portions thereof, may be part of an integrated circuit. Integrated circuits so manufactured are considered part of this invention.

Moreover, it should again be emphasized that the above-described embodiments of the invention are intended to be illustrative only. Other embodiments may use different types and arrangements of elements for implementing the described functionality. These numerous alternative embodiments within the scope of the appended claims will be apparent to one skilled in the art given the teachings herein.

Lastly, the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus for determining the presence of a tone in an input signal, the apparatus comprising data processing circuitry configured to perform the steps of:
   receiving a plurality of samples of the input signal;
   determining a first value at least in part by multiplying each of the plurality of samples of the input signal by respective ones of a first set of values for an impulse response and summing the results;
   determining a second value at least in part by multiplying each of a portion of the plurality of samples of the input signal by respective ones of a second set of values for the impulse response and summing the results;
   determining a power of the tone in the plurality of samples of the input signal at least in part by utilizing the first value and the second value.

2. The apparatus of claim 1, wherein the apparatus comprises a digital signal processor.

3. The apparatus of claim 1, wherein the data processing circuitry comprises one or more multipliers and one or more adders.

4. The apparatus of claim 1, further comprising memory circuitry coupled to the data processing circuitry, the memory circuitry storing the first and second set of values for the impulse response.

5. The apparatus of claim 1, wherein the data processing circuitry is further configured to determine a third value by subtracting the product of the second value and $\exp(-j\omega)$ from the first value, wherein $j=\sqrt{-1}$ and $\omega=2\pi f/f_s$, with f being the frequency of the tone and $f_s$ being a sampling frequency.

6. The apparatus of claim 5, further comprising memory circuitry coupled to the data processing circuitry, the memory circuitry storing a plurality of values for $\exp(-j\omega)$.

7. The apparatus of claim 1, further comprising a switch that closes when the last of the plurality of samples of the input signal is multiplied by a respective one of the first set of values for the impulse response.

8. The apparatus of claim 1, further comprising a switch that closes when the last of the portion of the plurality of samples of the input signal is multiplied by a respective one of the second set of values for the impulse response.

9. The apparatus of claim 1, further comprising memory circuitry coupled to the data processing circuitry, wherein the data processing circuitry comprises a program control unit configured to fetch program instructions from the memory circuitry.

10. The apparatus of claim 1, further comprising memory circuitry coupled to the data processing circuitry, wherein the data processing circuitry comprises an address generation unit configured to calculate memory addresses in the memory circuitry.

11. The apparatus of claim 1, wherein the data processing circuitry comprises an arithmetic logic unit configured to at least perform additions, multiplications, multiply-accumulate operations, dot-product operations, and dot-product-accumulate operations.

12. The apparatus of claim 1, further comprising a plurality of distinct software modules, each of the distinct software modules being embodied on a non-transient computer-readable storage medium, and wherein the distinct software modules comprise a first value calculation module, a second value calculation module, and a power calculation module, wherein:
the data processing circuitry is operative to perform the step of determining the first value at least in part by executing the first value calculation module;
the data processing circuitry is operative to perform the step of determining the second value at least in part by executing the second value calculation module; and
the data processing circuitry is operative to perform the step of determining the power of the tone at least in part by executing the power calculation module.

13. A method for determining the presence of a tone in an input signal, the method to be performed by a data processing system and comprising the steps of:
receiving a plurality of samples of the input signal;
determining a first value at least in part by multiplying each of the plurality of samples of the input signal by respective ones of a first set of values for an impulse response and summing the results;
determining a second value at least in part by multiplying each of a portion of the plurality of samples of the input signal by respective ones of a second set of values for the impulse response and summing the results;
determining the power of the tone in the plurality of samples of the input signal at least in part by utilizing the first value and the second value.

14. The method of claim 13, wherein the plurality of samples of the input signal consists of N samples, with N being an integer greater than one.

15. The method of claim 14, wherein the step of determining the first value utilizes no more than N multiplications.

16. The method of claim 14, wherein the step of determining the second value utilizes no more than (N−1) multiplications.

17. The method of claim 14, further comprising the step of determining a third value by subtracting the product of the second value and $\exp(-j\omega)$ from the first value, wherein $j=\sqrt{-1}$ and $\omega=2\pi=f/f_s$ with f being the frequency of the tone and $f_s$ being a sampling frequency.

18. The method of claim 17, further comprising the step of determining a fourth value by multiplying the third value by $\exp(-j\omega(N-1))$.

19. The method of claim 18 wherein the fourth value is a transformed input signal at the frequency of the tone.

20. The method of claim 13, further comprising providing a system, wherein the system comprises distinct software modules, each of the distinct software modules being embodied on a non-transient computer-readable storage medium, and wherein the distinct software modules comprise a first value calculation module, a second value calculation module, and a power calculation module, wherein:
the step of determining the first value is carried out by the first value calculation module executing on at least one hardware processor;
the step of determining the second value is carried out by the second value calculation module executing on the at least one hardware processor; and
the step of determining the power of the tone is carried out by the power calculation module executing on the at least one hardware processor.

21. A computer program code product comprising a non-transient computer readable storage medium having computer readable program code embodied thereon, the computer readable program code, when executed on a data processing system, configured to cause the data processing system to perform the steps of:
receiving a plurality of samples of an input signal;
determining a first value at least in part by multiplying each of the plurality of samples of the input signal by respective ones of a first set of values for an impulse response and summing the results;
determining a second value at least in part by multiplying each of a portion of the plurality of samples of the input signal by respective ones of a second set of values for the impulse response and summing the results; and
determining the power of a tone in the plurality of samples of the input signal at least in part by utilizing the first value and the second value.

* * * * *